Patented Nov. 3, 1936

2,059,600

UNITED STATES PATENT OFFICE 2,059,600

SOIL CONDITIONER

Charles Peter, Salt Lake City, Utah

No Drawing. Original application November 22, 1933, Serial No. 699,196. Divided and this application March 24, 1936, Serial No. 70,703

1 Claim. (Cl. 71—24)

This invention relates to a soil conditioner, and its principal object is to provide a material which may be worked into soils having dormant plant food locked up therein, in order that such dormant plant food may be made available for the nourishment of growing plants.

A more specific object is the provision of a soil conditioner which is convenient to handle and which is substantially odorless.

A further object is to provide an artificial substitute for organic matter consisting of manures, leaf moulds, and so on.

The present application is a division of my application Serial No. 699,196, filed November 22, 1933.

In the manufacture of my improved soil conditioner, coal, which may be cannel, lignite, sub-bituminous, bituminous or anthracite, is ground to pass a screen of approximately 40 to 70 mesh. Common salt, preferably in the form of rock salt, is ground to pass a screen of approximately 120 mesh. The ground coal and salt are mixed together, and the mixture is roasted at a temperature between approximately 300 degrees and 400 degrees Fahrenheit. This mixture when cooled to normal temperature, is the finished product.

In actual use, my improved conditioner has been found by skilled persons in agriculture, floriculture and horticulture, to be highly beneficial in promoting a healthy and fruitful growth of plant life. This beneficial result may be attributed to the unlocking of an otherwise dormant and unavailable supply of plant food in soils due to the judicious application of my improved conditioner to such soils.

I claim:

A soil conditioner, consisting of coal ground to pass a screen of approximately 40 to 70 mesh, and rock salt ground to pass a screen of approximately 120 mesh, the mixture having been roasted at a temperature approximately between 300 degrees and 400 degrees Fahrenheit.

CHARLES PETER.